(12) United States Patent
Bhan (10) Patent No.: US 7,820,036 B2
(45) Date of Patent: Oct. 26, 2010

(54) HIGHLY STABLE HEAVY HYDROCARBON HYDRODESULFURIZATION CATALYST AND METHODS OF MAKING AND USE THEREOF

(75) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 329 days.

(21) Appl. No.: 11/832,461

(22) Filed: Aug. 1, 2007

(65) Prior Publication Data
US 2008/0135453 A1 Jun. 12, 2008

Related U.S. Application Data

(60) Provisional application No. 60/821,341, filed on Aug. 3, 2006.

(51) Int. Cl.
*C10G 45/04* (2006.01)
(52) U.S. Cl. .............................. 208/216 PP; 208/216 R
(58) Field of Classification Search ............. 208/216 R, 208/216 PP
See application file for complete search history.

(56) References Cited

U.S. PATENT DOCUMENTS

| | | | | |
|---|---|---|---|---|
| 3,897,365 A | * | 7/1975 | Feins et al. ................. | 502/211 |
| 4,402,865 A | * | 9/1983 | Blakely ...................... | 502/313 |
| 4,443,558 A | * | 4/1984 | Gibson ....................... | 502/314 |
| 4,444,905 A | * | 4/1984 | Pessimisis .................. | 502/211 |
| 4,888,316 A | | 12/1989 | Gardner et al. ............. | 502/20 |
| 5,006,496 A | * | 4/1991 | Huizinga et al. ............ | 502/61 |
| 5,686,375 A | | 11/1997 | Iyer et al. ................... | 502/315 |
| 5,827,421 A | | 10/1998 | Sherwood, Jr. ............. | 208/112 |
| 6,015,485 A | * | 1/2000 | Shukis et al. ............... | 208/112 |
| 6,030,915 A | | 2/2000 | De Boer ..................... | 502/39 |

FOREIGN PATENT DOCUMENTS

| | | |
|---|---|---|
| GB | 2055602 | 3/1981 |
| GB | 2118063 | 10/1983 |
| WO | WO 0232570 | 4/2002 |

OTHER PUBLICATIONS

Tsakiroglou, C.D. et al. (2004). AICHE Journal, 50(2), 489-510.*
Murray, K.L. et al. (1999). Langmuir, 15, 8155-8160.*
Shariat, M.H. et al. (2001). Mineral Engineering, 14(7), 815-820.*

* cited by examiner

*Primary Examiner*—Robert J Hill, Jr.
*Assistant Examiner*—Brian McCaig
(74) *Attorney, Agent, or Firm*—Charles W. Stewart (57) ABSTRACT

Described is a catalyst useful in the hydroprocessing of a heavy hydrocarbon feedstock wherein the catalyst comprises a calcined mixture made by calcining a formed particle of a mixture comprising molybdenum trioxide, a nickel compound, and an inorganic oxide material. The catalyst may be made by mixing an inorganic oxide material, molybdenum trioxide, and a nickel compound to form a mixture that is formed into a particle and calcined to provide a calcined mixture. The process involves the hydrodesulfurization and hydroconversion of a heavy hydrocarbon feedstock which process may include the conversion of a portion of the pitch content of the heavy hydrocarbon feedstock and the yielding of a treated product having an enhanced stability as reflected by its P-value.

59 Claims, 2 Drawing Sheets

HIGHLY STABLE HEAVY HYDROCARBON HYDRODESULFURIZATION CATALYST AND METHODS OF MAKING AND USE THEREOF

This application claims the benefit of U.S. Provisional Application Ser. No. 60/821,341, filed Aug. 3, 2006.

BACKGROUND OF THE INVENTION

This invention relates to a catalyst, a method of making a catalyst and a process for making a hydrocarbon product having a low sulfur concentration. The invention further relates to a highly stable catalyst that is useful in the hydrodesulfurization of a heavy hydrocarbon feedstock, a method of making a highly stable catalyst for use in the hydrodesulfurization of a heavy hydrocarbon feedstock, and a process for the hydrodesulfurization of a heavy hydrocarbon product.

One process that is recognized by those skilled in the art of hydrocarbon hydroprocessing is the hydroconversion of heavy hydrocarbon feedstocks that contain hydrocarbons boiling above about 538° C. (1000° F.) so as to convert a portion of the heavy hydrocarbons into lighter hydrocarbons. It may also be desirable to simultaneously provide for the reduction of the sulfur content of such heavy hydrocarbon feedstocks. Many of the conventional catalysts used to provide for the hydroconversion and desulfurization of heavy hydrocarbon feedstocks contain a Group VIB metal component, such as molybdenum, and a Group VIII metal component, such as cobalt or nickel, supported on a refractory oxide support.

U.S. Pat. No. 5,827,421 (Sherwood, Jr) discloses a process for the hydroconversion and desulfurization of a heavy hydrocarbon feedstock using an alumina supported catalyst containing Group VIII and Group VIB metals and having specifically defined surface and pore characteristics. In its background section, this patent provides an extensive review and discussion of the prior art and the therein described catalysts used in the hydroconversion of heavy hydrocarbon feedstocks such as petroleum resid and other heavy hydrocarbons. This patent does not, however, provide any detail on the use of molybdenum trioxide as a necessary source of the molybdenum component of a hydroprocessing catalyst composition that is made by a method that includes the co-mulling of the molybdenum trioxide with an inorganic oxide material and a nickel compound.

U.S. Pat. No. 5,686,375 (Iyer et al.) mentions hydroprocessing catalysts that contain underbedded Group VIII metal components with the preferred catalyst comprising underbedded nickel and an overlayer of molybdenum. The patent states that many nickel and molybdenum compounds are useful for impregnation or comulling including precursors of molybdenum trioxide, but it does not specifically mention the comulling of molybdenum trioxide with the porous refractory support material in the preparation of its catalyst support that has an underbedded molybdenum component. The patent does, however, mention the incorporation of molybdenum onto the support that contains underbedded nickel by comulling instead of by impregnation. But, there is no teaching in the '375 patent of the preparation of a heavy hydrocarbon hydroconversion catalyst by the comulling of an inorganic support material with both molybdenum trioxide and a nickel compound followed by the resulting mixture being calcined to thereby form a catalyst material.

U.S. Pat. No. 6,030,915 (de Boer) discloses a hydroprocessing catalyst that uses regenerated spent hydroprocessing catalyst fines in the manufacture of a hydroprocessing catalyst. The patent further indicates that additional hydrogenation metals may be added to the catalyst composition by impregnation using an impregnation solution comprising water soluble salts of the hydrogenation metals to be incorporated into the catalyst composition. Also, an alternative method of incorporating the extra metal into the catalyst composition is indicated as including the mixing of either solid state or dissolved metal components with the mixture of regenerated spent hydroprocessing catalyst fines, binder, and, optionally, additive. The solid state metal may include solid molybdenum oxide. Additives are not indicated as being a catalytic metal compound. In the preparation of its catalyst, the '915 patent requires the regenerated spent hydroprocessing catalyst fines to be mixed with at least one additive, which may include a binder, such as alumina, silica, silica-alumina, titania and clays.

BRIEF SUMMARY OF THE INVENTION

It is desirable to have a catalyst that has a low production cost and which is useful in the hydrodesulfurization of a heavy hydrocarbon feedstock, such as a crude oil residue, while providing for a conversion of at least a portion of the heavy end of the heavy hydrocarbon feedstock to lighter hydrocarbons. It is further desirable for the hydrodesulfurized heavy hydrocarbon conversion product resulting from the use of the catalyst to exhibit highly stable properties as reflected by its P-value. It is also desirable for the hydroconversion catalyst to exhibit a low rate of deactivation at the higher temperatures that are typically required for providing for the conversion of the heavy end of a heavy hydrocarbon feedstock.

Thus, accordingly, a highly stable heavy hydrocarbon hydrodesulfurization catalyst is provided that comprises a calcined mixture made by calcining a formed particle of a mixture comprising molybdenum trioxide, a nickel compound, and an inorganic oxide material. This highly stable heavy hydrocarbon hydrodesulfurization catalyst may be made by the method comprising: co-mulling an inorganic oxide material, molybdenum trioxide, and a nickel compound to form a mixture; forming said mixture into a particle; and calcining said particle to provide a calcined mixture. The highly stable heavy hydrocarbon hydrodesulfurization catalyst further may be used in a process for the desulfurization of a heavy hydrocarbon feedstock, wherein said process comprises: contacting, under suitable heavy hydrocarbon desulfurization conditions, a heavy hydrocarbon feedstock with a heavy hydrocarbon hydrodesulfurization catalyst comprising a calcined mixture made by calcining a formed particle of a mixture comprising molybdenum trioxide, a nickel compound, and an inorganic oxide material; and yielding a desulfurized product.

DETAILED DESCRIPTION OF THE INVENTION

A novel catalyst composition has been discovered that is especially useful in the hydrodesulfurization and hydroconversion of heavy hydrocarbon streams that contain sulfur and heavy hydrocarbons having a boiling temperature greater than 538° C. (1000° F.). This catalyst composition exhibits exceptional stability in its desulfurization activity even though it is used at higher process temperature conditions than those typically used for hydrodesulfurization in order to provide for high conversion of the heavy hydrocarbons contained in the heavy hydrocarbon stream that is to be processed or treated. Also, the catalyst composition provides for a hydroconverted and desulfurized product that exhibits high stability in the sense that it has a low flocculation tendency as compared to hydroconverted products resulting from the use of alternative catalysts. Aside from the numerous catalytic and process advantages that the novel catalyst provides, it also has a low cost to produce due to the novel method of making the catalyst composition.

The inventive catalyst composition comprises a calcined mixture that is made by calcining a formed particle of a mixture comprising molybdenum trioxide, a nickel compound, and an inorganic oxide material. It is an essential aspect of the invention for at least a major portion of the molybdenum component of the inventive catalyst to be supplied by molybdenum trioxide as opposed to precursors of molybdenum trioxide such as certain of the salts of molybdenum, for example, ammonium dimolybdate and ammonium heptamolybdate. And, indeed, it is an important aspect of the invention for the mixture from which the particle is formed is to be made using molybdenum trioxide. It is preferred for the molybdenum trioxide used in the formation of the mixture to be in the form of a finely defined powder, which may be in a liquid suspension or slurry. Therefore, the mixture that is formed into a particle and thereafter calcined can comprise a substantial absence of a molybdenum compound that is in a form other than as molybdenum trioxide, such as, for example, a molybdenum salt compound.

What is meant herein when referring to the substantial absence of a molybdenum compound in a form other than as molybdenum trioxide is that the mixture that is shaped or formed into a formed particle and thereafter calcined under suitable calcination conditions, as more fully described elsewhere herein, contains less than a small or less than a negligible amount of a molybdenum compound other than molybdenum trioxide, such as, for example, a molybdenum salt compound or an inorganic molybdenum compound. Examples of molybdenum compounds other than molybdenum trioxide include ammonium molybdate, ammonium dimolybdate, ammonium heptamolybdate, molybdenum acetate, molybdenum bromide, molybdenum chloride, molybdenum sulfide, and molybdenum carbide. It is, thus, desirable for the mixture to contain less than 2 weight percent, based on the total weight of the mixture, of a molybdenum compound other than molybdenum trioxide. It is preferred for the mixture to contain less than 1 weight percent of a molybdenum compound other than molybdenum trioxide, and, most preferred, less than 0.5 weight percent.

In another embodiment of the invention, the mixture may consist essentially of molybdenum trioxide, a nickel compound, and an inorganic oxide material. As the phrase "consist essentially of", or similar phraseology, is used herein in defining the elements or components that make up the mixture, what is meant is that a material amount of any molybdenum compound other than molybdenum trioxide is excluded from the mixture. This phrase, however, is not intended to mean that excluded from the recited components of the mixture are material amounts of other compounds such as promoter components including phosphorous compounds. A material amount of a molybdenum compound other than molybdenum trioxide is an amount of such compound contained in the mixture that provides for a material affect upon the catalytic performance properties of the final catalyst. These catalyst performance properties are discussed in detail elsewhere herein.

The amount of molybdenum trioxide that is contained in the mixture should be such as to provide for the final calcined mixture having a molybdenum content in the range upwardly to 12 weight percent, as metal, (18 wt. % based on $MoO_3$), with the weight percent being based on the total weight of the calcined mixture. However, it is desirable for the amount of molybdenum trioxide that is contained in the mixture to be such as to provide for the final calcined mixture having a molybdenum content in the range of from 4 to 11 wt. %, as metal (6 to 16.5 wt. %, as oxide), but, preferably, from 5 to 10 wt. % (7.5 to 15 wt. %, as oxide), and, most preferably, from 6 to 9 wt. % (9 to 13.5 wt. %, as oxide).

In addition to the molybdenum trioxide component, the mixture further contains a nickel compound. The source of the nickel component of the mixture is not as critical to the manufacture of the inventive catalyst as is the source of the molybdenum component, and, thus, the nickel component may be selected from any suitable nickel compound that is capable of being mixed with the other components of the mixture and to be shaped into a particle that is to be calcined to form the final calcined mixture. The nickel compounds may include, for example, the nickel hydroxides, nickel nitrates, nickel acetates, and nickel oxides.

The amount of nickel compound that is contained in the mixture should be such as to provide for the final calcined mixture having a nickel content in the range upwardly to 4 weight percent, as metal, (5.1 wt. % based on NiO), with the weight percent being based on the total weight of the calcined mixture. However, it is desirable for the amount of the nickel compound that is contained in the mixture to be such as to provide for the final calcined mixture having nickel content in the range of from 0.5 to 3.5 wt. %, as metal (0.64 to 4.45 wt. %, as oxide), but, preferably, from 1 to 3 wt. % (1.27 to 3.82 wt. %, as oxide), and, most preferably, from 1.5 to 2.5 wt. % (1.91 to 3.18 wt. %, as oxide).

In addition to the molybdenum trioxide component and the nickel compound, the mixture further includes an inorganic oxide material. Any suitable porous inorganic refractory oxide that will provide the surface structure properties required for the inventive catalyst may be used as the inorganic oxide material component of the mixture. Examples of possible suitable types of porous inorganic refractory oxides include silica, alumina, and silica-alumina. Preferred is either alumina or silica-alumina.

The amount of inorganic oxide material that is contained in the mixture is such as to provide an amount in the range of from 50 to 95 weight percent inorganic oxide material in the final calcined mixture with the weight percent being based on the total weight of the calcined mixture. Preferably, the amount of inorganic oxide material in the calcined mixture is in the range of from 60 to 92 weight percent, and, most preferably, from 70 to 89 weight percent.

In addition to the requirement that the source of the molybdenum component of the inventive catalyst is to be predominantly provided by molybdenum trioxide, the surface characteristics of the inventive catalyst can also be important to its performance in the hydroconversion and desulfurization of a heavy hydrocarbon feed stream containing a concentration of sulfur. It is important for the inventive catalyst to have a mean pore diameter that is within a specific, narrow range and to have a low macroporosity as hereafter described. In order to provide for the desired catalytic properties, the mean pore diameter of the inventive catalyst is, generally, in the range of from 85 angstroms (Å) to 100 Å. Preferably, the mean pore diameter is in the range of from 86 to 98 angstroms, and, most preferably, from 87 to 97 angstroms.

The inventive catalyst should, in addition to having a mean pore diameter that is within the specific and narrow range as discussed above, also have a low macroporosity where a small percentage of the total pore volume of the catalyst is contained within the macropores of the inventive catalyst. The term macropore is defined as a catalyst pore of a catalyst composition having a diameter greater than 350 angstroms. It is preferred for the inventive catalyst to have a low macroporosity such that less than 4.5 percent of the total pore volume is contained within its macropores, but, more preferred, is that less than 4 percent of the total pore volume is contained in its macropores, and, most preferred, less than 3.5 percent of the total pore volume is contained in its macropores. Also, it is desirable for the pore structure of the inventive catalyst to be such that less than 1 percent of the total pore volume to be contained within its macropores having a diameter greater than 1000 angstroms, and it is more desirable that less than 0.9 percent of the total pore volume to be contained within the macropores having a diameter greater than 1000 angstroms, and, most desirable, less than 0.8 percent of the total pore volume to be contained within the macropores having a diameter greater than 1000 angstroms A further important property of the inventive catalyst is for it to have a significantly high surface area. It is the particular combination of a significantly high surface area in combination with the narrow distribution of pore diameters and the use of the molybdenum trioxide as the molybdenum source in the manufacture of the inventive catalyst that contributes to many of the important performance properties of the inventive catalyst. It is desirable for the inventive catalyst to have a reasonably high surface area that exceeds 230 $m^2/g$. Preferably, the surface area of the inventive catalyst exceeds 240 $m^2/g$, and, most preferably, it exceeds 250 $m^2/g$.

It has been found that the inventive method provides for the novel catalyst that, as earlier noted, exhibits particularly good properties when it is used in the dual hydrodesulfurization and hydroconversion of a heavy hydrocarbon stream that contains both a concentration of sulfur and heavy hydrocarbons. While it is not known with certainty, it is believed that many of the beneficial catalytic properties of the inventive catalyst are associated with the novel method of manufacturing the catalyst and, also, in the use of molybdenum trioxide for the principal source of the molybdenum component of the catalyst as opposed to the use of alternative molybdenum sources in such manufacturing. It is surmised that the reason for this is in someway associated with molybdenum trioxide having acidic and other unique properties such that when it is combined with the alumina it more effectively incorporates and disperses itself within the alumina matrix. In fact, an examination of certain scan electron micrographs of the inventive catalyst that has been sulfided suggests that there is a significantly lower degree of molybdenum disulfide ($MOS_2$) slab stacking with the stacks having reduced heights and lengths as compared to alternative molybdenum-containing hydroprocessing catalysts.

The inventive method for making the catalyst of the invention includes the mixing of the appropriate starting materials to form a mixture that is formed or agglomerated into particles that are then calcined to thereby provide a calcined mixture. The calcined mixture itself may be used as the highly stable dual hydroconversion and hydrodesulfurization catalyst or it may be activated prior to or during its use by any number of known methods including treatment with hydrogen or with sulfur or sulfur compounds, such as, elemental sulfur, hydrogen sulfide or an organic sulfur compound.

The first step of the inventive method includes combining the starting materials of the catalyst to form a mixture. The essential starting materials in the preparation of the mixture include molybdenum trioxide that is preferably in the form of finely divided particles that may be as a dry powder or as particles in a suspension or slurry, and an inorganic oxide material, such as, inorganic oxide material selected from the group consisting of alumina, silica and alumina-silica. Also, a nickel component may further be combined with the molybdenum trioxide and inorganic oxide material in the formation of the mixture. The nickel component may be selected from any suitable source of nickel including nickel salt compounds, both dry or dissolved in solution, or any other nickel compound including those mentioned above.

The formation of the mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of starting materials of the catalyst may be conducted during any suitable time period necessary to properly homogenize the mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, it is an important aspect of the inventive method for at least a major portion of the molybdenum source of the catalyst to be predominantly molybdenum trioxide. In the mixing or co-mulling of the starting materials of the catalyst, it is preferred for the molybdenum trioxide to be in a finely divided state either as a finely powdered solid or as fine particles in a suspension or slurry. It is best for the particle sizes of the particulate molybdenum trioxide used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm).

While it is not known with certainty, it is believed that it is advantageous to the invention for the molybdenum trioxide that is used in the manufacture of the inventive catalyst to be in the form of as small particles as is practically possible; so, therefore, it is not desired to have a lower limit on the size of the molybdenum trioxide particles used in the manufacture of the catalyst. However, it is understood that the particle size of the molybdenum trioxide used in the manufacture of the catalyst will generally have a lower limit to its size of greater than 0.2 microns. Thus, the particle size of the molybdenum trioxide used in the formation of the mixture in the manufacture of the inventive catalyst is preferably in the range of from 0.2 to 150 μm, more preferably, from 0.3 to 100 μm, and, most preferably, from 0.5 to 75 μm. Typically, the size distribution of the molybdenum trioxide particles, whether in a dry powder or a suspension or otherwise, is such that at least 50 percent of the particles have a maximum dimension in the range of from 2 to 15 μm.

Once the starting materials of the catalyst are properly mixed and formed into the shaped or formed particles, a drying step may advantageously be used for removing certain quantities of water or volatiles that are included within the mixture or formed particles. The drying of the formed particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 760° C. (1400° F.). The temperature conditions at which the particles are calcined can be important to the control of the pore structure of the final calcined mixture. Due to the presence of the molybdenum trioxide in the formed particles, the calcination temperature required to provide for a calcined mixture having the required pore structure is higher than typical temperatures required to calcine other compositions containing inorganic oxide materials, especially those that do not contain molybdenum trioxide. But, in any event, the temperature at which the formed particles are calcined to provide the finally calcined mixture is controlled so as to provide the finally calcined mixture having the pore structure properties as described in detail herein. The preferred calcination temperature is in the range of from 510° C. (950° F.) to 730° C. (1346° F.), and, most preferably, from 540° C. (1004° F.) to 705° C. (1301° F.).

The calcined mixture is particularly useful as a high stability hydroprocessing catalyst for use in the hydroprocessing of a heavy feedstock stream that has high pitch and sulfur contents. Prior to its use, the calcined mixture may, but is not required to, be sulfided or activated by any of the methods known to those skilled in the art. Generally, in its use in the hydroprocessing of a hydrocarbon feedstock, the calcined mixture is contained within a reaction zone, such as that which is defined by a reactor vessel, wherein a hydrocarbon feedstock is contacted with the calcined mixture under suitable hydroprocessing reaction conditions and from which a treated hydrocarbon product is yielded.

The preferred hydrocarbon feedstock of the inventive process is a heavy hydrocarbon feedstock. The heavy hydrocarbon feedstock may be derived from any of the high boiling temperature petroleum cuts such as atmospheric tower gas oils, atmospheric tower bottoms, vacuum tower gas oils, and vacuum tower bottoms or resid. It is a particularly useful aspect of the inventive process to provide for the hydroprocessing of a heavy hydrocarbon feedstock that can be generally defined as having a boiling temperature at its 5% distillation point, i.e. T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavier hydrocarbons that have boiling temperatures above 538° C. (1000° F.). These heavier hydrocarbons are referred to herein as pitch, and, as already noted, it is recognized that one of the special features of the inventive catalyst or process is that it is particularly effective in the hydroconversion of the pitch content of a heavy hydrocarbon feedstock. The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

The heavy hydrocarbon feedstock further may include a significantly high sulfur content. One of the special features of the invention is that it provides for both the desulfurization of the heavy hydrocarbon feedstock and the conversion of the pitch to lighter hydrocarbons having lower boiling temperatures than those of the pitch hydrocarbons. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the invention is that it provides for the desulfurization of the heavy feedstock that has a significantly high sulfur content, such as a sulfur content greater than 1 weight percent, so as to provide for a treated hydrocarbon product having a reduced sulfur content, such as a sulfur content of less than 1 weight percent. When referring herein to the sulfur content of either the heavy hydrocarbon feedstock or the treated hydrocarbon product, the weight percents are determined by the use of testing method ASTM D-4294. The inventive process is particularly useful in the processing of a heavy hydrocarbon feedstock that has a sulfur content exceeding 2 weight percent, and with such a heavy hydrocarbon feedstock, the sulfur content may be in the range of from 2 to 8 weight percent. The inventive catalyst and process is especially useful in the processing of a heavy hydrocarbon feedstock having an especially high sulfur content of exceeding 3 or even 4 weight percent and being in the range of from 3 to 7 weight percent or even from 4 to 6.5 weight percent.

The inventive process utilizes the inventive catalyst in the hydroprocessing of the heavy hydrocarbon feedstock to provide for the simultaneous desulfurization and conversion of pitch to yield the treated hydrocarbon product having reduced sulfur and pitch contents. In this process, the heavy hydrocarbon feedstock is contacted with the inventive catalyst under suitable hydrodesulfurization and hydroconversion process conditions and the treated hydrocarbon product is yielded. The treated hydrocarbon product should have a reduced sulfur content that is below that of the heavy hydrocarbon feedstock, such as a sulfur content of less than 1 weight percent. It is preferred for the reduced sulfur content of the treated hydrocarbon product to be less than 0.8 weight percent, and, most preferably, less than 0.6 weight percent. It is recognized that the inventive process, however, may have the capability of effectively desulfurizing the heavy hydrocarbon feedstock to provide the treated hydrocarbon product having a reduced sulfur content of less than 0.5 and even less than 0.4 weight percent.

The inventive process may further provide for a conversion of a portion of the pitch content of the heavy hydrocarbon feedstock. When referring herein to the conversion of pitch or to pitch conversion or other similar terminology, what is meant is that a portion of the hydrocarbons contained in the heavy hydrocarbon feedstock that has a boiling temperature exceeding 538° C. (1000° F.) is converted to hydrocarbons having a boiling temperature less than 538° C. (1000° F.). In a preferred embodiment of the inventive process, the pitch conversion is greater than 20 volume percent of the pitch contained in the heavy hydrocarbon feedstock, and, more preferably, the pitch conversion exceeds 30 volume percent. Most preferably, the pitch conversion exceeds 40 volume percent of the pitch contained in the heavy hydrocarbon feedstock. A practical upper limit for the pitch conversion is 90 volume percent, and, more typically, the upper limit for the pitch conversion is 60 volume percent. Thus, the pitch conversion, for example, may be in the range of from 20 to 90 volume percent, or from 30 to 60 volume percent, or from 40 to 60 volume percent.

At higher levels of pitch conversion the treated hydrocarbon product quality tends to suffer. This is believed to be due to the agglomeration of the asphaltene structures contained in the heavy hydrocarbon feedstock being processed. This agglomeration can, at extreme conditions, result in the separation of the solid fraction from the treated hydrocarbon product and laying down or deposition of the solids upon process equipment surfaces. In general, the upper limit of pitch conversion is the point at which product precipitation begins to appear. Various techniques have been used in the petroleum process industry to predict the onset of such precipitation, including proprietary testing methods and the P-value test as it is more fully described elsewhere herein.

One of the advantages provided by the high pitch conversion of the inventive process is that it results in yielding of the treated hydrocarbon product having hydrocarbons having boiling temperatures in the naphtha, distillate (diesel and kerosene), and vacuum gas oil temperature ranges. These yielded products may be pooled with product streams made by other refinery process units or they may be further processed. For instance, the distillate products of the inventive process may undergo further hydroprocessing to yield such products as kerosene, aviation fuel and diesel, and the vacuum gas oil product of the inventive process may be used as feedstock to a refinery unit such as a fluid catalytic cracking unit or a hydrocracking unit. Depending upon the particular market conditions, the distillate fraction yielded from the inventive process can be especially valuable, thus, making a higher distillate yield, as opposed to higher yields of naphtha and vacuum gas oil, highly desirable.

In addition to providing for a significant conversion of the pitch content of the heavy hydrocarbon feedstock, the inventive catalyst and process may provide for an incrementally greater yield of distillate product than alternative catalysts and processes, and, thus, they can provide greater economic benefits than other alternatives. The inventive process may further provide for a greater proportion of the pitch of the heavy hydrocarbon feedstock that is converted to hydrocarbons having a boiling temperature less than 538° C. (1000° F.) that is converted to hydrocarbons boiling in the distillate boiling range of from 180° C. (356° F.) to 350° C. (662° F.), or to distillate hydrocarbons. The inventive process, thus, can provide a treated hydrocarbon product, wherein the proportion of the converted pitch that includes hydrocarbons boiling in the distillate boiling range exceeds 10 weight percent of the converted pitch. The inventive process preferably provides a treated hydrocarbon product that includes a proportion of converted pitch that includes hydrocarbons boiling in the distillate boiling range that exceeds 14 weight percent of the converted pitch, more preferably, exceeding 16 weight percent of the converted pitch, and, most preferably, exceeding 18 weight percent of the converted pitch. This feature of the inventive process is particularly beneficial when, in combination with other processing, an ultra low sulfur diesel product is manufactured. This benefit is due to the high amount of yielded distillate product having a relatively low sulfur content which makes further severe hydroprocessing to make ultra low sulfur diesel product unnecessary. Mild hydrodesulfurization processing may, however, be required.

Another feature of the inventive process is that, in addition to providing for desulfurization and pitch conversion, it can provide for a significant reduction in the Micro-Carbon Residue (MCR) content of the treated hydrocarbon product of the process that utilizes the inventive catalyst. Micro-Carbon Residue content refers to a quantity of carbon residue remaining after evaporation and pyrolysis of a substrate and is determined by the testing method ASTM D4530. In cases when the heavy hydrocarbon feedstock has a significant MCR content, the inventive process can provide for a treated hydrocarbon product having an MCR content that is below that of the heavy hydrocarbon feedstock, and, in fact, the inventive catalyst can provide for a greater reduction in the MCR content than other prior art catalysts. This enhancement in the ability to reduce the MCR content of a feedstock is particularly advantageous in those situations when the inventive process is providing for a treated hydrocarbon product that is to be used, or portions thereof are to be used, as feedstock to a fluid catalytic cracking (FCC) unit. This benefit is recognized in that the MCR content of an FCC feedstock can significantly impact the amount of such feedstock that the FCC unit is capable of processing. In general, an FCC unit is able to process larger quantities of feedstocks that have low levels of MCR content than those feedstocks that have high levels of MCR content.

In the inventive process, the heavy hydrocarbon feedstock may have an MCR value exceeding 6%. The inventive process is particularly useful in the processing of a heavy hydrocarbon feedstock that has an MCR value exceeding 8% and even exceeding 10%. The treated hydrocarbon product can have an MCR value of less than 6%, preferably, less than 5%, and, more preferably, less than 4%.

One disadvantage from the use of the prior art hydroconversion catalysts in the hydroconversion of heavy hydrocarbon feedstocks is that the resulting product will tend to have a low P-value. The P-value (peptization value) is a numerical value that is an indicator of the flocculation tendency of the asphaltenes contained in a hydrocarbon mixture. The determination of the P-value is the method as described by J. J. Heithaus in "Measurement and Significance of Asphaltene Peptization", Journal of Institute of Petroleum, Vol. 48, Number 458, February 1962, pp. 45-53, which publication is incorporated herein by reference.

A high P-value for a hydrocarbon mixture indicates that it is stable and a low P-value for a hydrocarbon mixture indicates that it is not as stable in that there is a greater tendency for precipitation of the asphaltenes contained the hydrocarbon mixture. It is recognized that the P-value of a hydroconverted product tends to decline as the percentage of the pitch component of a heavy hydrocarbon feedstock that is converted increases, thus, indicating a higher tendency for forming precipitates. But, it is one of the advantages of the inventive catalyst and process that they provide for a high amount of pitch conversion while still providing for a treated hydrocarbon product that still has an acceptably high P-value that exceeds 1.25. The catalyst and process can provide for a pitch conversion of greater than 30 volume percent while still providing for a treated hydrocarbon product having a P-value greater than 1.25. It is preferred for the P-value of the treated hydrocarbon product to exceed 1.5, more preferably, to exceed 1.75, and, most preferably, exceeding 2, when the pitch conversion of the heavy hydrocarbon feedstock that is provided by the inventive catalyst and process exceeds 30 volume percent. In some instances, the P-value of the heavy hydrocarbon feedstock may be less than 1.

The calcined mixture (catalyst) of the invention may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the heavy hydrocarbon feedstock into the reactor vessel, and a reactor effluent outlet means, such as an effluent outlet nozzle, for withdrawing the reactor effluent or the treated hydrocarbon product from the reactor vessel.

The inventive process generally operates at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig).

The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the inventive process is generally such as to provide a liquid hourly space velocity (LHSV) in the range of from 0.01 $hr^{-1}$ to 3 $hr^{-1}$. The term "liquid hourly space velocity", as used herein, means the numerical ratio of the rate at which the heavy hydrocarbon feedstock is charged to the reaction zone of the inventive process in volume per hour divided by the volume of catalyst contained in the reaction zone to which the heavy hydrocarbon feedstock is charged. The preferred LHSV is in the range of from 0.05 $hr^{-1}$ to 2 $hr^{-1}$, more preferably, from 0.1 $hr^{-1}$ to 1.5 $hr^{-1}$. and, most preferably, from 0.2 $hr^{-1}$ to 0.7 $hr^{-1}$.

It is preferred to charge hydrogen along with the heavy hydrocarbon feedstock to the reaction zone of the inventive process. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The following examples are presented to further illustrate the invention, but they are not to be construed as limiting the scope of the invention.

Example I

This Example I describes the preparation of Catalyst A.

Catalyst A

The Catalyst A was prepared by first combining 3209 parts by weight 2% silica interstage alumina, 287 parts by weight nickel nitrate ($Ni(NO_3)_2$) dissolved in 99 parts by weight deionized water, 269 parts by weight molybdenum trioxide powder ($MoO_3$), and 652 parts by weight crushed regenerated Ni/Mo/P hydrotreating catalyst within a Muller mixer along with 130 parts by weight 69.9% concentrated nitric acid and 30 grams of a commercial extrusion aid. A total of 2948 parts by weight of water was added to these components during the mixing. The components were mixed for approximately 40 minutes. The mixture had a pH of 4.08 and an LOI of 55.7 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 426° C. (800° F.), 566° C. (1050° F.), 677° C. (1250° F.), or 732° C. (1350° F.). The final calcined mixture contained 2.2 weight percent nickel metal (2.8 wt. % as NiO), 7.9 weight percent molybdenum metal (11.85 wt. % as $MoO_3$) and 85.45 weight percent 2% silica/alumina. The following Table 1 presents certain properties of the dried extrudate particles that were calcined at each of the calcination temperatures. As may be seen from the pore properties presented in Table 1, the percentage of the total pore volume contained in the macropores having a pore diameter of 1000 Angstroms and larger is less than 1 percent.

TABLE 1

Properties of Dried Extrudate for Different Calcination Conditions

| Properties | 426° C. (800° F.) | 566° C. (1050° F.) | 677° C. (1250° F.) | 732° C. (1350° F.) |
|---|---|---|---|---|
| Surface Area, $m^2/g$ | 332 | 311 | 256 | 133.5 |
| Hg Pore Size Dist. (Angs) | | | | |
| less than 70 | 38.8 | 28.3 | 9.8 | 0.8 |
| 70-100 | 41.2 | 50.1 | 48.7 | 1.6 |
| 100-150 | 12.2 | 13.5 | 31.3 | 18.3 |
| 150-350 | 5.7 | 6.0 | 7.5 | 66.9 |
| 350-1000 | 1.9 | 1.9 | 2.0 | 11.1 |
| 1000+ | 0.2 | 0.2 | 0.7 | 0.3 |
| Total Pore Volume, cc/g | 0.551 | 0.564 | 0.596 | 0.702 |
| Medium Pore Diameter, Å | 76 | 81 | 96 | 128 |

Example II

Constant Sulfur Conversion Example

This Example II describes one of the methods used in testing the catalysts described in Example I. This method provided for the processing of a feedstock having a significant sulfur concentration to yield a product having specified sulfur concentration. The reactor temperature was adjusted to maintain the fixed sulfur concentration in the reactor product.

Catalyst A and a Commercially Available hydrodemetallization catalyst were loaded into a 1.5875 cm (⅝ inch) ID by 127 cm (50 inch) stainless steel tube reactor in a stacked bed arrangement with 66.7 volume percent of the bed consisting of Catalyst A placed at the bottom of the catalyst bed and 33.3 volume percent of the bed consisting of the hydrodemetallization catalyst placed at the top of the catalyst bed.

The tube reactor was equipped with thermocouples placed in a 0.635 cm (¼ inch) thermowell inserted concentrically into the catalyst bed, and the reactor tube was held within a 132 cm (52 inch) long 5-zone furnace with each of the zones being separately controlled based on a signal from a thermocouple.

The catalyst of the stacked catalyst bed was activated by feeding at ambient pressure a gas mixture of 5 vol. % $H_2S$ and 95 vol. % $H_2$ to the reactor at a rate of 1.5 LHSV while incrementally increasing the reactor temperature at a rate of 100° F./hr up to 400° F. The catalyst bed was maintained at a temperature of 400° F. for two hours and then the temperature was incrementally increased at a rate of 100° F./hr to a temperature of 600° F., where it was held for one hour followed again by an incremental increase in the temperature at a rate of 75° F./hr up to a temperature of 700° F., where it was held for two hours before cooling the catalyst bed temperature down to the ambient temperature. The catalyst bed was then pressured with pure hydrogen at 1000 psig, and the temperature of the catalyst bed was incrementally increased at a rate of 100° F./hr to 400° F. The reactor was then charged with feedstock while the temperature of the reactor was held at 400° F. for one hour. The catalyst bed temperature was then incrementally increased at a rate of 50° F./hr up 700° F., from which point the run was started.

The feedstock charged to the reactor was a Middle Eastern long residue. The distillation properties of the feedstock as determined by ASTM Method D7169 are presented in Table 2. Table 3 presents certain other properties of the feedstock.

TABLE 2

Distillation of Feedstock

| Wt. % | Temp, ° C. (° F.) |
|---|---|
| IBP | 273 (523) |
| 10 | 377 (711) |
| 20 | 427 (801) |
| 30 | 466 (871) |
| 40 | 503 (937) |
| 50 | 543 (1009) |
| 60 | 588 (1090) |
| 70 | 636 (1177) |
| 80 | 695 (1283) |
| 90 | |
| FBP | 737 (1359) |

TABLE 3

Other properties of the feedstock

| Property | Value |
|---|---|
| Micro-Carbon Residue (MCR) | 12.4 |
| Sulfur (wt %) | 4.544 |
| Nickel (ppm) | 22 |
| Vanadium (ppm) | 75 |
| 1000° F.+ (vol %) | 51.3 |

The feedstock was charged to the reactor along with hydrogen gas. The reactor was maintained at a pressure of 1900 psig and the feedstock was charged to the reactor at a rate so as to provide a liquid hourly space velocity (LHSV) of 0.33 $hr^{-1}$ and the hydrogen was charged at a rate of 3,000 SCF/bbl. The temperature of the reactor was set so as to provide a product having a sulfur content of 0.52 wt. %.

The inventive Catalyst A provides for a product having a significantly reduced sulfur content over the sulfur content of the feedstock processed. The sulfur content of the product was less than 0.6 weight percent with the hydrodesulfurization activity of the catalyst remaining stable over a significant time period.

Example III

This Example III describes the preparation of Catalyst B.

Catalyst B

The Catalyst B was prepared by first dissolving 252 parts by weight of $Ni(NO_3)_2 \cdot 6H_2O$ in 87 parts of DI water and heating the solution until clear. Separately, 281 parts by weight of $MoO_3$ was combined with 3209 parts of alumina (2% silica in 98% alumina) and 639 parts of fresh, crushed and sieved commercial Ni—Mo—P catalyst containing alumina and combined together in a muller. With the muller running, 2905 parts of DI water, nickel solution and 19 parts of nitric acid (69.8% concentration) were added to the mull mix. The mixture was mulled for a total of 35 minutes. The mixture had a pH of 4.18 and an LOI of 56.6 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 800° F., 1000° F., and 1200° F. The final calcined mixture contained 2.2 weight percent nickel metal (2.8 wt. % as NiO), 7.9 weight percent molybdenum metal (11.85 wt. % as $MoO_2$), 0.34% of phosphorus (0.55 wt. % of phosphorus pentaoxide), and 84.8 weight percent 2% silica/alumina. The following Table 4 presents certain properties of the dried extrudate particles that were calcined at each of the calcination temperatures.

TABLE 4

Properties of Dried Extrudate for Different Calcination Conditions

| Properties | 426° C. (800° F.) | 538° C. (1000° F.) | 649° C. (1200° F.) |
|---|---|---|---|
| Crush Strength, lbs/mm | 5.63 | 5.72 | 5.03 |
| Water Pore Volume, ml/g | 0.63 | 0.61 | 0.64 |

TABLE 4-continued

Properties of Dried Extrudate for Different Calcination Conditions

| Properties | 426° C. (800° F.) | 538° C. (1000° F.) | 649° C. (1200° F.) |
|---|---|---|---|
| Hg Pore Size Dist. - Hg | | | |
| <70 A | 34.1 | 24.2 | 11.2 |
| 70-100 A | 60.4 | 69.3 | 75.4 |
| 100-130 A | 2.6 | 3.2 | 9.6 |
| 130-150 | 0.6 | 0.7 | 0.9 |
| 150-180 A | 0.8 | 0.8 | 0.8 |
| 180-350 A | 1.4 | 1.4 | 1.6 |
| 350 A+ | 0.1 | 0.4 | 0.5 |
| Medium Pore Diameter, Å | 74 | 79 | 90 |
| Total Pore Volume, Hg, cc/g | 0.57 | 0.60 | 0.59 |
| Surface Area, m2/g | 323 | 315 | 272 |

Example IV

Constant Reactor Temperature Example

This Example describes one of the methods used in testing the catalyst described in Example III. This method provided for the processing of a feedstock having significant sulfur and pitch contents to yield a product having reduced sulfur and pitch contents and product liquid that is stable. The reactor temperature was kept constant in conducting these reactions and the sulfur content, the pitch content and the product liquid quality were monitored.

A multi-barrel reactor was used to conduct this test. The heating block contained four parallel tube reactors each of which was 0.59 inch ID by 23.625 inches in length 321 stainless steel tube. A single temperature controller was used to control the heater block, which encased all four of the reactors. Each of the tube reactors was loaded in a stacked bed arrangement with 30 cm³ of Catalyst B placed at the bottom of the catalyst bed and 6 cm³ of a commercially available hydrodemetallization catalyst placed at the top of the catalyst bed. One of the reactors was loaded with a commercially available alumina supported nickel and molybdenum hydrodesulfurization catalyst product of Criterion Catalyst Company designated as RN-650 (Catalyst C) as used in the other runs and a commercial HDM catalyst in the remaining bottom section.

The catalyst of the stacked catalyst bed was activated by feeding at ambient pressure a gas mixture of 5 vol. % $H_2S$ and 95 vol. % $H_2$ to the reactor at a rate of 30 SLPH while incrementally increasing the reactor temperature at a rate of 100° F./hr up to 400° F. The catalyst bed was maintained at a temperature of 400° F. for two hours, and, then, the temperature was incrementally increased at a rate of 100° F./hr to a temperature of 600° F., where it was held for two hours followed again by an incremental increase in the temperature at a rate of 50° F./hr up to a temperature of 700° F., where it was held for two hours before cooling the catalyst bed temperature of 400° F.

The feedstock charged to the reactor was a Middle Eastern crude. The distillation properties of the feedstock as determined by ASTM Method D7169 are presented in Table 5. Table 6 presents certain other properties of the feedstock.

TABLE 5

Distillation of Feedstock

| Wt. % | Temp, ° C. (° F.) |
|---|---|
| IBP | |
| 10 | 351 (664) |
| 20 | 399 (750) |
| 30 | 437 (819) |
| 40 | 472 (882) |
| 50 | 510 (950) |
| 60 | 554 (1029) |
| 70 | 602 (1116) |
| 80 | 657 (1215) |
| 90 | 725 (1337) |
| FBP | 733 (1351) |

TABLE 6

Other properties of the feedstock

| Property | Value |
|---|---|
| Micro-Carbon Residue (MCR) | 11.4 |
| Sulfur (wt %) | 4.012 |
| Nickel (ppm) | 16.7 |
| Vanadium (ppm) | 59 |
| 1000° F.+ (vol %) | 43.5 |

Feedstock was charged to the reactors along with hydrogen gas. The reactors were maintained at a pressure of 1900 psig, and the feedstock was charged to the reactors at a rate so as to provide a liquid hourly space velocity (LHSV) of 0.6 hr 1 and the hydrogen was charged at a rate of 3,000 SCF/bbl. The temperatures of the reactors were fixed at 725° F. for approximately a month and then raised to 752° F. for the remaining duration.

Figure 1:
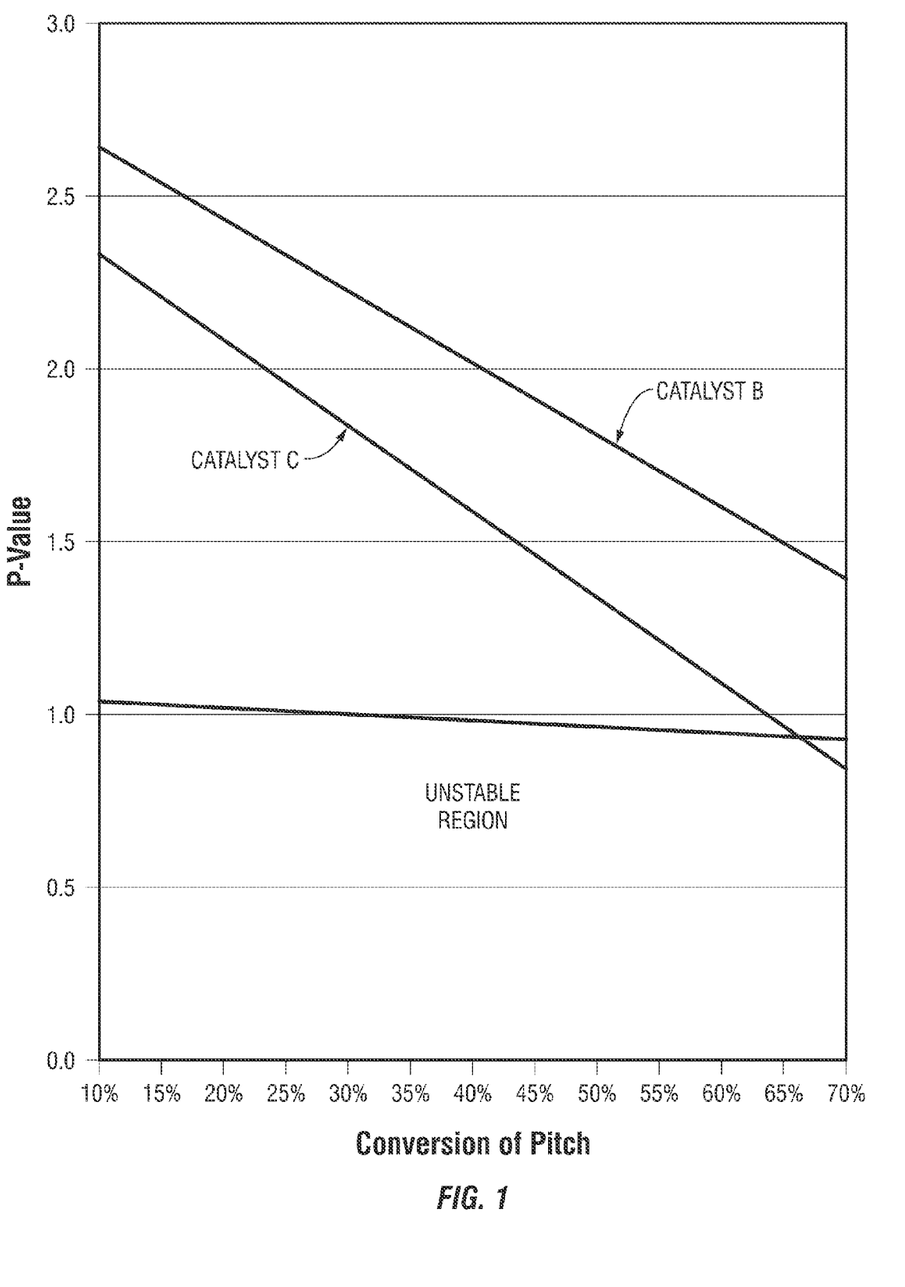
FIG. 1 presents plots of the P-value of the product yielded from the hydroprocessing of heavy hydrocarbon feedstock when using the inventive catalyst as compared to a comparison catalyst as a function of pitch conversion. As may be seen from the two plots, the inventive catalyst provides for a product having a higher P-value than that provided by the comparison catalyst and, thus, a more stable product.

Presented in FIG. 1 are plots (the estimated linear function based on experimental data) of the P-value of product as a function of pitch conversion of the feedstock for the process using the inventive Catalyst B and for the comparison Catalyst C. As may be observed from the data presented in FIG. 1, the inventive Catalyst B provides for a product stability as reflected by the P-value that is significantly higher than comparison Catalyst C. At both the temperatures of operation, the inventive catalyst provides for a higher pitch conversion and a higher product P-value. The comparison catalyst provides for a less stable product when pitch conversion approaches 65% than does the inventive catalyst, which provides for a stable product at a significantly higher pitch conversion.

Example V

This Example V describes the preparation of Catalyst D and a comparison Catalyst E.

Catalyst D

The Catalyst D was prepared by first combining 4047 parts by weight 2% silica interstage alumina, 378 parts by weight nickel nitrate ($Ni(NO_3)_2$) dissolved in 138 parts by weight deionized water, and 418 parts by weight molybdenum trioxide powder ($MoO_3$) within a Muller mixer. A total of 3807 parts by weight of water was added to these components during the mixing. The components were mixed for approximately 45 minutes. The mixture had a pH of 4.75 and an LOI of 59.6 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 1000° F., 1250° F., 1300° F., or 1350° F. The final calcined mixture contained 2.2 weight percent nickel metal (2.8 wt. % as NiO), 7.9 weight percent molybdenum metal (11.85 wt. % as $MoO_3$) and 85.45 weight percent 2% silica/alumina. The following Table 7 presents certain properties of the dried extrudate particles that were calcined at a calcination temperature of 1250° F.

TABLE 7

Properties of Dried and Calcined Extrudate

| Properties | 677° C. (1250° F.) |
|---|---|
| Crush Strength, lbs/mm | 3.81 |
| Water Pore Volume, ml/g | 0.75 |
| Hg Pore Size Dist. - Hg | |
| <70 A | 5.5 |
| 70-100 A | 53.6 |
| 100-130 A | 33.6 |
| 130-150 | 2.1 |
| 150-180 A | 1.4 |
| 180-350 A | 2.6 |
| 350 A+ | 1.2 |
| Medium Pore Diameter, Å | 98 |
| Total Pore Volume, Hg, cc/g | 0.695 |
| Surface Area, m2/g | 261 |

Catalyst E

The comparison Catalyst E was made by combining 4104 parts of alumina powder with 127 parts of nickel as nickel hydroxide and mulling briefly. With muller running, added 4104 parts of deionized water were added and muller mix mulled for 55 minutes. Then, the molybdenum as ammonium di-molybdate (i.e. a molybdenum salt) and mulled for additional five minutes. The mixture had a pH of 7.23 and an LOI of 59 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 1000° F. and 1200° F. The final calcined mixture contained 2.2 weight percent nickel metal (2.8 wt. % as NiO), 7.9 weight percent molybdenum metal (11.85 wt. % as $MoO_3$) and 85.35 weight percent alumina. The following Table 8 presents certain properties of the dried extrudate particles that were calcined at a calcination temperature of 1250° F.

TABLE 8

Properties of Dried and Calcined Extrudate

| Properties | 649° C. (1200° F.) |
|---|---|
| Crush Strength, lbs/mm | 3.57 |
| Water Pore Volume, ml/g | 0.87 |
| Hg Pore Size Dist. | |
| <70 A | 3.3 |
| 70-100 A | 29.8 |
| 100-130 A | 58.9 |
| 130-150 | 2.6 |
| 150-180 A | 1.6 |
| 180-350 A | 2.3 |
| 350 A+ | 1.5 |
| Total Pore Volume, cc/g | 0.69 |
| Medium Pore Diameter, Å | 105 |
| BET Surface Area, m2/g | 254.1 |

Example VI

Constant Temperature Long-Term Testing

This Example VI describes one of the methods used in testing the catalysts described in Example V. This method provided for the processing of a feedstock having significant sulfur and MCR contents to yield a product having reduced sulfur content. The reactor temperature was kept constant in conducting these reactions and the sulfur content of the product was monitored.

A multi-barrel reactor was used to conduct this test. The heating block contained four parallel tube reactors each of which was 0.59 inch ID by 23.625 inches in length 321 stainless steel tube. A single temperature controller was used to control the heater block, which encased all four of the reactors. Each of the tube reactors was loaded in a stacked bed arrangement with 30 $cm^3$ of the catalyst to be test (either Catalyst D or E) placed at the bottom of the catalyst bed and 6 $cm^3$ of a commercially available hydrodemetallization catalyst placed at the top of the catalyst bed.

The catalyst of the stacked catalyst bed was activated by feeding at ambient pressure a gas mixture of 5 vol. % $H_2S$ and 95 vol. % $H_2$ to the reactor at a rate of 30 SLPH while incrementally increasing the reactor temperature at a rate of 100° F./hr up to 400° F. The catalyst bed was maintained at a temperature of 400° F. for two hours, and, then, the temperature was incrementally increased at a rate of 100° F./hr to a temperature of 600° F., where it was held for two hours followed again by an incremental increase in the temperature at a rate of 50° F./hr up to a temperature of 700° F., where it was held for two hours before cooling the catalyst bed temperature of 400° F.

The feedstock charged to the reactor was a Middle Eastern crude. The distillation properties of the feedstock as determined by ASTM Method D7169 are presented in Table 9. Table 10 presents certain other properties of the feedstock.

TABLE 9

Distillation of Feedstock

| Wt. % | Temp, ° C. (° F.) |
|---|---|
| IBP | |
| 10 | 351 (664) |
| 20 | 399 (750) |
| 30 | 437 (819) |
| 40 | 472 (882) |
| 50 | 510 (950) |
| 60 | 554 (1029) |
| 70 | 602 (1116) |
| 80 | 657 (1215) |
| 90 | 725 (1337) |
| FBP | 733 (1351) |

TABLE 10

| Other properties of the feedstock | |
|---|---|
| Property | Value |
| Micro-Carbon Residue (MCR) | 11.4 |
| Sulfur (wt %) | 4.012 |
| Nickel (ppm) | 16.7 |
| Vanadium (ppm) | 59 |
| 1000° F.+ (vol %) | 43.5 |

Feedstock was charged to the reactors along with hydrogen gas. The reactors were maintained at a pressure of 1900 psig, and the feedstock was charged to the reactors at a rate so as to provide a liquid hourly space velocity (LHSV) of 0.6 hr 1 and the hydrogen was charged at a rate of 3,000 SCF/bbl. The temperatures of the reactors were fixed at either 725° F. or 752° F.

Figure 2:
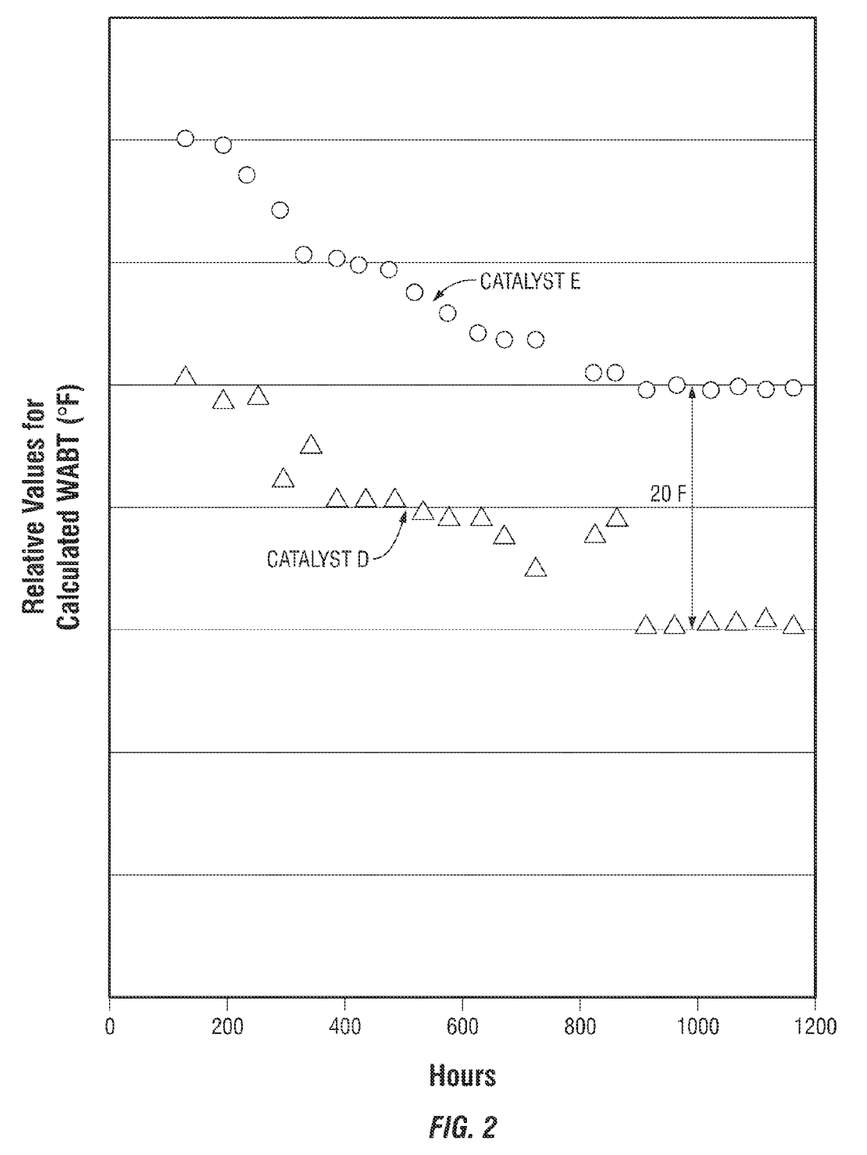
FIG. 2 presents comparison plots of the relative values for the calculated Weight Average Bed Temperature (WABT) as a function of time for an 88% hydrodesulfurization of a heavy feedstock using the inventive catalyst as compared to a comparison catalyst. The slope of the plots provide an indication

Presented in FIG. 2 are plots of the relative values for the calculated Weight Average Bed Temperature (WABT) that would be required for an 88 wt % hydrodesulfurization of the feedstock as a function of run time for the inventive Catalyst D and the comparison Catalyst E. As may be observed from the data presented in FIG. 1, the inventive Catalyst D exhibits catalytic activity over time that is significantly higher than the activity of the comparison Catalyst E.

That which is claimed is:

1. A method of making a highly stable heavy hydrocarbon hydrodesulfurization catalyst, wherein said method comprises:
    co-mulling an inorganic oxide material, molybdenum trioxide, and a nickel compound to form a mixture;
    forming said mixture into a particle; and
    calcining said particle to provide a calcined mixture having a pore size distribution such that at least 70% of the total pore volume of said calcined mixture is in the pores of said calcined mixture having a pore diameter in the range of from 70 angstroms to 150 angstroms.

2. A method as recited in claim 1, wherein said calcining step is conducted under a controlled temperature condition in which the calcination temperature is in the range of from about 600° C. (1112° F.) to about 760° C. (1400° F.) for a calcination time period that is effective to provide said calcined mixture having a desired pore structure.

3. A method as recited in claim 2, wherein said mixture consists essentially of molybdenum trioxide, a nickel compound, and an inorganic oxide material.

4. A method as recited in claim 3, wherein said calcined mixture has a low macroporosity such that less than 4.5 percent of the total pore volume is contained within its macropores.

5. A method as recited in claim 4, wherein said calcined mixture has a mean pore diameter in the range of from 85 angstroms to 100 angstroms.

6. A method as recited in claim 5, wherein less than 1 percent of the total pore volume of said calcined mixture is contained within its macropores having a diameter greater than 1000 angstroms.

7. A method as recited in claim 6, wherein said calcined mixture has a surface area that exceeds 230 $m^2/g$.

8. A method as recited in claim 7, wherein said mixture contains less than 2 weight percent, based on the total weight of the mixture, of a molybdenum compound other than molybdenum trioxide.

9. A method as recited in claim 8, wherein said mixture comprises an amount of said inorganic oxide material such as to provide an amount in the range of from 50 to 95 weight percent inorganic oxide material in said calcined mixture with the weight percent being based on the total weight of said calcined mixture.

10. A method as recited in claim 9, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

11. A method as recited in claim 10, wherein said calcining step is conducted at a calcination temperature in the range of from 450° C. to 760° C.

12. A method as recited in claim 11, wherein said molybdenum trioxide of said co-mulling step is in a finely divided state comprising particles of particulate molybdenum trioxide of particle sizes of greater than 0.2 microns and less than 500 microns.

13. A method as recited in claim 2, wherein said mixture has a material absence of a molybdenum salt compound.

14. A method as recited in claim 13, wherein said co-mulling step is conducted such that said mixture has a pH that is maintained in the range of from 3 to 6.

15. A method as recited in claim 14, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

16. A method as recited in claim 14, wherein said calcined mixture has a low macroporosity such that less than 4.5 percent of the total pore volume is contained within its macropores.

17. A method as recited in claim 16, wherein said calcined mixture has a mean pore diameter in the range of from 85 angstroms to 100 angstroms.

18. A method as recited in claim 17, wherein less than 1 percent of the total pore volume of said calcined mixture is contained within its macropores having a diameter greater than 1000 angstroms.

19. A method as recited in claim 18, wherein said calcined mixture has a surface area that exceeds 230 $m^2/g$.

20. A method as recited in claim 19, wherein said mixture contains less than 2 weight percent, based on the total weight of the mixture, of a molybdenum compound other than molybdenum trioxide.

21. A method as recited in claim 20, wherein said mixture comprises an amount of said inorganic oxide material such as to provide an amount in the range of from 50 to 95 weight percent inorganic oxide material in said calcined mixture with the weight percent being based on the total weight of said calcined mixture.

22. A method as recited in claim 21, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

23. A method as recited in claim 22, wherein said calcining step is conducted at a calcination temperature in the range of from 450° C. to 760° C.

24. A method as recited in claim 23, wherein said molybdenum trioxide of said co-mulling step is in a finely divided state comprising particles of particulate molybdenum trioxide of particle sizes of greater than 0.2 microns and less than 500 microns.

25. A method as recited in claim 1, wherein said calcined mixture has a low macroporosity such that less than 4.5 percent of the total pore volume is contained within its macropores.

26. A method as recited in claim 25, wherein said calcined mixture has a mean pore diameter in the range of from 85 angstroms to 100 angstroms.

27. A method as recited in claim 26, wherein less than 1 percent of the total pore volume of said calcined mixture is contained within its macropores having a diameter greater than 1000 angstroms.

28. A method as recited in claim 27, wherein said calcined mixture has a surface area that exceeds 230 m²/g.

29. A method as recited in claim 28, wherein said mixture contains less than 2 weight percent, based on the total weight of the mixture, of a molybdenum compound other than molybdenum trioxide.

30. A method as recited in claim 29, wherein said mixture comprises an amount of said inorganic oxide material such as to provide an amount in the range of from 50 to 95 weight percent inorganic oxide material in said calcined mixture with the weight percent being based on the total weight of said calcined mixture.

31. A method as recited in claim 30, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

32. A method as recited in claim 31, wherein said calcining step is conducted at a calcination temperature in the range of from 450° C. to 760° C.

33. A method as recited in claim 32, wherein said molybdenum trioxide of said co-mulling step is in a finely divided state comprising particles of particulate molybdenum trioxide of particle sizes of greater than 0.2 microns and less than 500 microns.

34. A highly stable heavy hydrocarbon hydrodesulfurization catalyst, comprising:
a calcined mixture made by calcining a formed particle of a mixture comprising molybdenum trioxide, a nickel compound, and an inorganic oxide material, wherein said calcined mixture has a pore size distribution such that at least 70% of the total pore volume of said calcined mixture is in the pores of said calcined mixture having a pore diameter in the range of from 70 angstroms to 150 angstroms.

35. A highly stable heavy hydrocarbon hydrodesulfurization catalyst as recited in claim 34, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

36. A highly stable heavy hydrocarbon hydrodesulfurization catalyst as recited in claim 35, wherein said calcined mixture has a property such that when used in the desulfurization of a heavy hydrocarbon feedstock a desulfurized product results that exhibits a P-value of greater than 1.5.

37. A highly stable heavy hydrocarbon hydrodesulfurization catalyst as recited in claim 36, wherein said mixture comprises an amount of said inorganic oxide material such as to provide an amount in the range of from 50 to 95 weight percent inorganic oxide material in said calcined mixture with the weight percent being based on the total weight of said calcined mixture.

38. A highly stable heavy hydrocarbon hydrodesulfurization catalyst as recited in claim 37, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

39. A highly stable heavy hydrocarbon hydrodesulfurization catalyst as recited in claim 38, wherein said calcined mixture has a low macroporosity such that less than 4.5 percent of the total pore volume is contained within its macropores.

40. A highly stable heavy hydrocarbon hydrodesulfurization catalyst as recited in claim 39, wherein said calcined mixture has a mean pore diameter in the range of from 85 angstroms to 100 angstroms.

41. A highly stable heavy hydrocarbon hydrodesulfurization catalyst as recited in claim 40, wherein less than 1 percent of the total pore volume of said calcined mixture is contained within its macropores having a diameter greater than 1000 angstroms.

42. A highly stable heavy hydrocarbon hydrodesulfurization catalyst as recited in claim 41, wherein said calcined mixture has a surface area that exceeds 230 m²/g.

43. A highly stable heavy hydrocarbon hydrodesulfurization catalyst as recited in claim 42, wherein said mixture contains less than 2 weight percent, based on the total weight of the mixture, of a molybdenum compound other than molybdenum trioxide.

44. A highly stable heavy hydrocarbon hydrodesulfurization catalyst as recited in claim 34, wherein said mixture comprises an amount of said inorganic oxide material such as to provide an amount in the range of from 50 to 95 weight percent inorganic oxide material in said calcined mixture with the weight percent being based on the total weight of said calcined mixture.

45. A highly stable heavy hydrocarbon hydrodesulfurization catalyst as recited in claim 44, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

46. A highly stable heavy hydrocarbon hydrodesulfurization catalyst as recited in claim 45, wherein said calcined mixture has a low macroporosity such that less than 4.5 percent of the total pore volume is contained within its macropores.

47. A highly stable heavy hydrocarbon hydrodesulfurization catalyst as recited in claim 46, wherein said calcined mixture has a mean pore diameter in the range of from 85 angstroms to 100 angstroms.

48. A highly stable heavy hydrocarbon hydrodesulfurization catalyst as recited in claim 47, wherein less than 1 percent of the total pore volume of said calcined mixture is contained within its macropores having a diameter greater than 1000 angstroms.

49. A highly stable heavy hydrocarbon hydrodesulfurization catalyst as recited in claim 48, wherein said calcined mixture has a surface area that exceeds 230 $m^2/g$.

50. A highly stable heavy hydrocarbon hydrodesulfurization catalyst as recited in claim 49, wherein said mixture contains less than 2 weight percent, based on the total weight of the mixture, of a molybdenum compound other than molybdenum trioxide.

51. A process for the desulfurization of a heavy hydrocarbon feedstock, wherein said process comprises:

contacting, under suitable heavy hydrocarbon desulfurization conditions, said heavy hydrocarbon feedstock with a catalyst comprising a calcined mixture made by calcining a formed particle of a mixture comprising molybdenum trioxide, a nickel compound, and an inorganic oxide material, wherein said calcined mixture has a pore size distribution such that at least 70% of the total pore volume of said calcined mixture is in the pores of said calcined mixture having a pore diameter in the range of from 70 angstroms to 150 angstroms; and yielding a treated hydrocarbon product.

52. A process as recited in claim 51, wherein said heavy hydrocarbon feedstock is characterized as having a heavy hydrocarbon feedstock P-value of less than 1 and said treated hydrocarbon product is characterized as having a treated hydrocarbon product P-value exceeding 1.25.

53. A process as recited in claim 52, wherein said mixture comprises an amount of said inorganic oxide material such as to provide an amount in the range of from 50 to 95 weight percent inorganic oxide material in said calcined mixture with the weight percent being based on the total weight of said calcined mixture.

54. A process as recited in claim 53, wherein said calcined mixture has a molybdenum content in the range of from 4 weight percent to 18 weight percent with the weight percent being based upon the molybdenum as $MoO_3$ and the total weight of the calcined mixture, and a nickel content in the range of from 1 weight percent to 5.1 weight percent with the weight percent being based upon the nickel as NiO and the total weight of the calcined mixture.

55. A process as recited in claim 54, wherein said calcined mixture has a low macroporosity such that less than 4.5 percent of the total pore volume is contained within its macropores.

56. A process as recited in claim 55, wherein said calcined mixture has a mean pore diameter in the range of from 85 angstroms to 100 angstroms.

57. A process as recited in claim 56, wherein less than 1 percent of the total pore volume of said calcined mixture is contained within its macropores having a diameter greater than 1000 angstroms.

58. A process as recited in claim 57, wherein said calcined mixture has a surface area that exceeds 230 $m^2/g$.

59. A process as recited in claim 58, wherein said mixture contains less than 2 weight percent, based on the total weight of the mixture, of a molybdenum compound other than molybdenum trioxide.

* * * * *